United States Patent [19]

Wang

[11] Patent Number: 4,467,351
[45] Date of Patent: Aug. 21, 1984

[54] MINIMAL RADIOLOGIC IMAGING METHOD AND APPARATUS

[76] Inventor: Yen Wang, 6883 Reynolds St., Pittsburgh, Pa. 15208

[21] Appl. No.: 325,656

[22] Filed: Nov. 30, 1981

[51] Int. Cl.$^3$ ............................................. H04N 5/14
[52] U.S. Cl. ..................................... 358/111; 378/99; 364/414
[58] Field of Search .................. 358/111, 166; 378/99; 364/515, 414, 415

[56] References Cited

U.S. PATENT DOCUMENTS

4,058,832 11/1977 Vagi ..................................... 358/111
4,323,973 4/1982 Greenfield ........................... 358/111

Primary Examiner—John C. Martin
Assistant Examiner—Edward L. Coles
Attorney, Agent, or Firm—Stanley J. Price, Jr.; John M. Adams

[57] ABSTRACT

X-rays at a minimal exposure level representing 25% of the conventional exposure are emitted from an X-ray tube and pass through a subject, such as a patient undergoing radiographic examination. The minimal exposure X-rays are detected by a preselected detector means, such as illuminated film, an X-ray intensifier, a CT scanner, a radioactive nuclear scanner or an image intensifier in combination with a television camera. The detector converts the radiation emerging from the subject to light images in the case of the video system. The light images are converted to electronic signals in a television camera. In the case of the CT scanner and nuclear scanner a photodiode array or scintillation crystal is actuated by the emerging radiation to generate an electrical current proportional to the intensity of the emerging radiation. The electronic signal is transmitted to an analog to digital converter, and the digital signal is transmitted to a computer for storage. Simultaneously, the digital signal is processed by the computer in accordance with a mathematical model to convert the signal representing the minimal exposure level to a signal representing the maximum or conventional exposure level. Output from the computer representing the maximum exposure level is either suitably stored for later retrieval or the retrieval or the digital signals are converted to analog signals for transmission to a video display device. In this manner, a radiograph is obtained by exposing the subject to substantially less than the conventional radiation level and having the degree of spatial resolution normally obtained at the conventional radiation level.

8 Claims, 9 Drawing Figures

FIG. 7    A sample film/screen characteristic

MINIMAL RADIOLOGIC IMAGING METHOD AND APPARATUS

BACKGROUND OF THE INVENTION

1. Field of the Invention

This invention relates to radiologic imaging method and apparatus and more particularly to a method and apparatus for reducing the radiation exposure to a subject while maintaining the desired qualities of a conventionally obtained radiograph.

2. Description of the Prior Art

In the past, techniques have been developed for the digital encoding of fluoroscopic images in the digital angiography and for digitalization of the output images of X-ray detectors by computerized axial tomography techniques. These techniques have concentrated on imaging production and have not addressed the problem of reducing the level of radiation exposure to the subject. The need for a reduction in either the radiation dose or noise has been recognized as disclosed at the 6th Conference of the Proceedings of ACR/IEEE Computer Society in 1979 on the computer applications in radiology. The emphasis, however, has been placed on refinements in the X-ray equipment, as for example, the improvements in radiography apparatus as disclosed in U.S. Pat. No. 4,179,100 rather than minimizing the radiation dosage to the subject.

The known approaches to data have centered on image production as opposed to reduction in the radiation exposure other than by reducing the time of exposure and/or the areas of exposure, as disclosed in *Med. Physics*, Vol. 7, pages 13–18, January/February, 1980, *Picture Processing And Digital Filtering* by T. S. Huang, 1975 and *Digital Image Processing* by W. K. Pratt, 1978. In the development of digital radiography systems, the emphasis has been placed on the primary X-ray detector and the image acquisition procedure. This has lead to the development of area detectors, line scan detectors, and point scan or flying spot detectors. All these systems require a two dimensional projection image.

Typical detector devices for digital X-ray imaging include solid state line scanned systems, large area fluorescent screen-TV camera digital devices and selenium photoconductor area detectors. One of the major impediments to the utilization of digital imaging processing has been the large memory size and long data processing time required. This has hampered the development of digital angiography, digital fluoroscopy, CT and other digital radiography technology. However, by minimizing the X-ray dosage, the problem of large memory size and long data processing time can also be resolved and thereby improve the development of CT, digital angiography, and digital fluoroscopy. This is particularly desirable for these types of systems which are all processed through a digital form.

Therefore, there is need for a digital imaging process that permits reduced radiation exposure in radiological diagnosis by the use of conventional X-ray equipment without a loss in spatial resolution and contrast information. By reducing the radiation dosage, the time for processing the digital information can be accelerated; and the storage space required to process the digital information in the memory system can be substantially reduced.

SUMMARY OF THE INVENTION

In accordance with the present invention, there is provided apparatus for radiologic diagnosis of a subject by projecting penetrating radiation through the subject that includes a source of radiation for emitting X-rays or Gamma rays at a preselected intensity. The radiation source is controlled to emit X-rays or Gamma rays at a preselected magnitude less than 100% of the radiation intensity of the source upon the subject. Conversion means converts the radiation emerging from the subject to an output signal corresponding to the intensity of the emerging radiation. Means is provided for digitalizing the output signal to a digital signal. Enhancement means receives the digital signal and enhances the digital signal to a corresponding signal representing 100% of the radiation intensity. Image generating means receives the enhanced digital signal and produces a radiologic image of the subject.

Further in accordance with the present invention, there is provided a method for generating a radiologic image of a subject exposed to penetrating radiation that includes the steps of emitting a beam of radiation from a source at a preselected magnitude less than 100% of the radiation intensity of the source. The beam of radiation is projected at the reduced intensity through the subject. The radiation emerging from the subject is converted to an output signal corresponding to the intensity of the emerging radiation. The output signal is digitalized to a digital signal. The digital signal is enhanced to a corresponding digital signal representing 100% of the radiation intensity of the source. The enhanced digital signal is processed to produce a radiologic image of the subject.

Preferably, the image enhancement means includes a computer, operable to convert the incoming digital signals to digital signals representing 100% of the conventional exposure used in conventional radiologic imaging techniques. The computer receives the digital signals from an analog to digital converter. The information processed by the computer is either stored for later retrieval or suitably displayed, such as by a video monitor or recorded on digital magnetic tape. The data storage may be either in digital form or analog form.

Accordingly, the principal object of the present invention is to provide method and apparatus for reducing the radiation exposure to a subject in radiologic imaging by computer enhancement of a digitalized signal obtained from radiation exposure at a level of intensity substantially less than the standard level of radiation intensity conventionally used in radiologic imaging.

Another object of the present invention is to provide method and apparatus for the digital processing of radiologic images obtained from minimal radiation exposure wherein minimal image data is enhanced to yield image data comparable in quality to image data generated from maximum or standard radiation exposure.

A further object of the present invention is to provide a digital imaging process of minimal radiography to reduce the conventionally used levels of radiation exposure for routine radiological examination.

An additional object of the present invention is to provide a system for processing radiologic images that permits the use of smaller storage memory and provides faster information processing than is currently available with the conventionally known radiologic imaging techniques using 100% radiation exposure.

A still further object of the present invention is to provide a system for processing nuclear scan images that permits the use of reduced levels of intensity of radioactive isotopes.

A further object of the present invention is to provide a digital imaging process for generating 100% information density images from a low information density of nuclear magnetic resonant scanning.

Another object of the present invention is to provide radiologic examination of dynamic functions at one-fourth or less than the level of radiation exposure of conventional radiologic examination and digitally manipulate the data by a computerized digital imaging process to obtain a radiologic image equivalent to a radiologic image obtained at 100% exposure.

Another object of the present invention is to provide a digital radiographic system compatible with digital fluoroscopy, digital angiography, solid state radiography, and computerized tomography to permit the use of 25% or less exposure and obtain radiographs having the quality of 100% exposure.

These and other objects of the present invention will be more completely described and disclosed in the following specification, the accompanying drawings and the appended claims.

DESCRIPTION OF THE PREFERRED EMBODIMENTS

Figure 1:
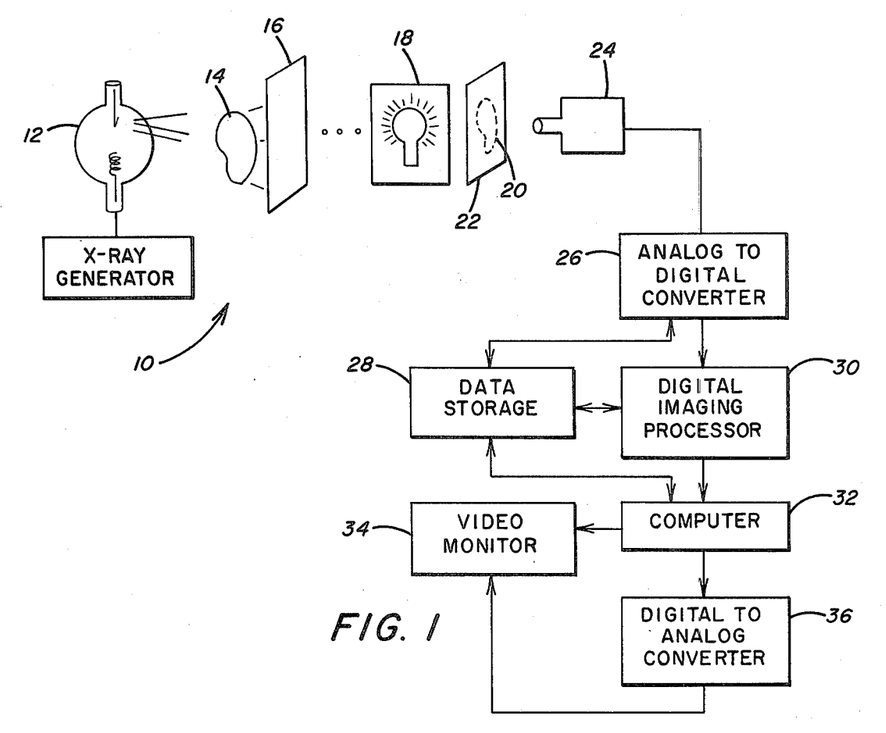
FIG. 1 is a block diagram of a digital video radiologic imaging system for use with minimal radiation exposure to the subject.

Referring to the Figures and particlarly to FIG. 1, there is illustrated a digital film/screen radiologic imaging system generally designated by the numeral 10 for use in clinical diagnosis of the condition of an internal structure of a subject. Radiation from a source, such as a radiation generator with a minimum potential of 150 KVP and a maximum current capacity of 1,300 MA is emitted from X-ray tube 12. A suitable X-ray tube is one having a high flux X-ray source and heat capacity of MR ($2.58 \times 10^{-7}$ C/kg) per exposure with nominal focal spots of 0.6, 1, and 2 mm.

While the X-ray tube 12 is capable of emitting X-rays at a preselected maximum level of exposure in accordance with the present invention, the X-ray tube is operated to emit radiation at a magnitude substantially less than the 100% exposure at which the X-ray tube is known conventionally to operate. Preferably, the level of exposure of the radiation emitted from the X-ray tube 12 is 25% or less of the maximum radiation which the X-ray tube is capable of transmitting. The radiation at the 25% intensity exposure is emitted from the tube 12 through a selected portion 14, of a subject such as an internal organ of a patient. The X-rays that pass through the portion 14 are directed upon a suitable detector device 16 such as on 35 mm. cine or cut film. The images on the cut film 16 are transilluminated by an illuminator 18. The illuminator 18 illuminates an image 20 of the object 14 on a film 22. The image 20 is viewed by a high sensitivity, low noise vidicon camera 24. Preferably the camera 24 includes a plumbicon type video tube which has a high signal to noise ratio in excess of 800:1 and is incorporated in the camera. The vidicon camera 24 converts the radiation in the form of the image 20 cast on the film 22 to an output signal proportional in magnitude to the 25% radiation exposure from the X-ray tube 12.

The output signal from the camera 24 is transmitted to a digitizer 26, such as an analog to digital converter having a capability of 10 mega words/sec. and 10 bit accuracy. A commercially available digitizer adaptable for use with the present invention is the Colorado Video, Inc., model 280 digitizer. The output from the digitizer 26 is in the form of a digital signal that is suitably stored at 28 for later retrieval of the digitalized signal. The digital signal is also directed from the digitizer 26 to a digital imaging processor 30 having digital image storage of $1024 \times 1024 \times 10$ bit with a mapping memory. A computer 32 controls the digital imaging processor 30. The digital data is thus processed and stored by the processor 30 through the computer 32.

A computer adaptable for use with the present invention is a mini computer of the VAX/780 type having high speed processing and large memory capability. By operation of the computer 32 and processor 30, the digitalized images are processed to enhance the magnitude of the images from that of the 25% radiation intensity to that equivalent to 100% radiation intensity. The process for enhancing the radiologic images obtained at 25% or less radiation intensity will be described later in greater detail. Also as shown in FIG. 1, the processor 30 is operable to transmit data for storage at 28 and retrieve data from storage at 28.

After computer enhancement, the processed digital data from the computer 32 is also stored at 28 or is transmitted to a video display screen 34 for digital readout. In addition, the processed images can be converted from digital data back to analog data by a converter 36. In this manner, the digital data from computer 32 representing 100% radiation intensity is converted to analog form representing 100% radiation intensity. From the converter 36, the data in analog form is displayed on the video display screen 34 to provide pictorial imaging of the subject, either an organ or an anatomical dynamic function. The resultant output from the computer, either in digital or analog form, represents the desirable characteristics of 100% radiation intensity where the source of radiation was operated at 25% radiation exposure intensity. A suitable device for evaluating both the digital and analog data from the computer 32 is a digital magnetic tape recorder having the capability of processing raw data at 1024×1024×8 bits at 30 frames/sec.

The computer enhancement of the digital radiography to obtain the equivalent of 100% radiation exposure intensity can be obtained from exposure intensities at any magnitude, such as for example, 25%, 50%, and 75% of the intensity of the conventional exposure used in digital radiography. For example, instead of exposing the subject to a standard exposure of 60 kVp (kilovoltage peak) with 60 mas, (milliampere per sec) the exposure can be at a 25% level or 60 kVp with 15 mas. By digitalizing the imaging signals obtained at lower radiation levels by a high speed analog to digital converter to obtain digitalized radiological images on a TV monitor and multiphomatic radiographs the subject is exposed to more moderate levels of radiation.

Figure 6:
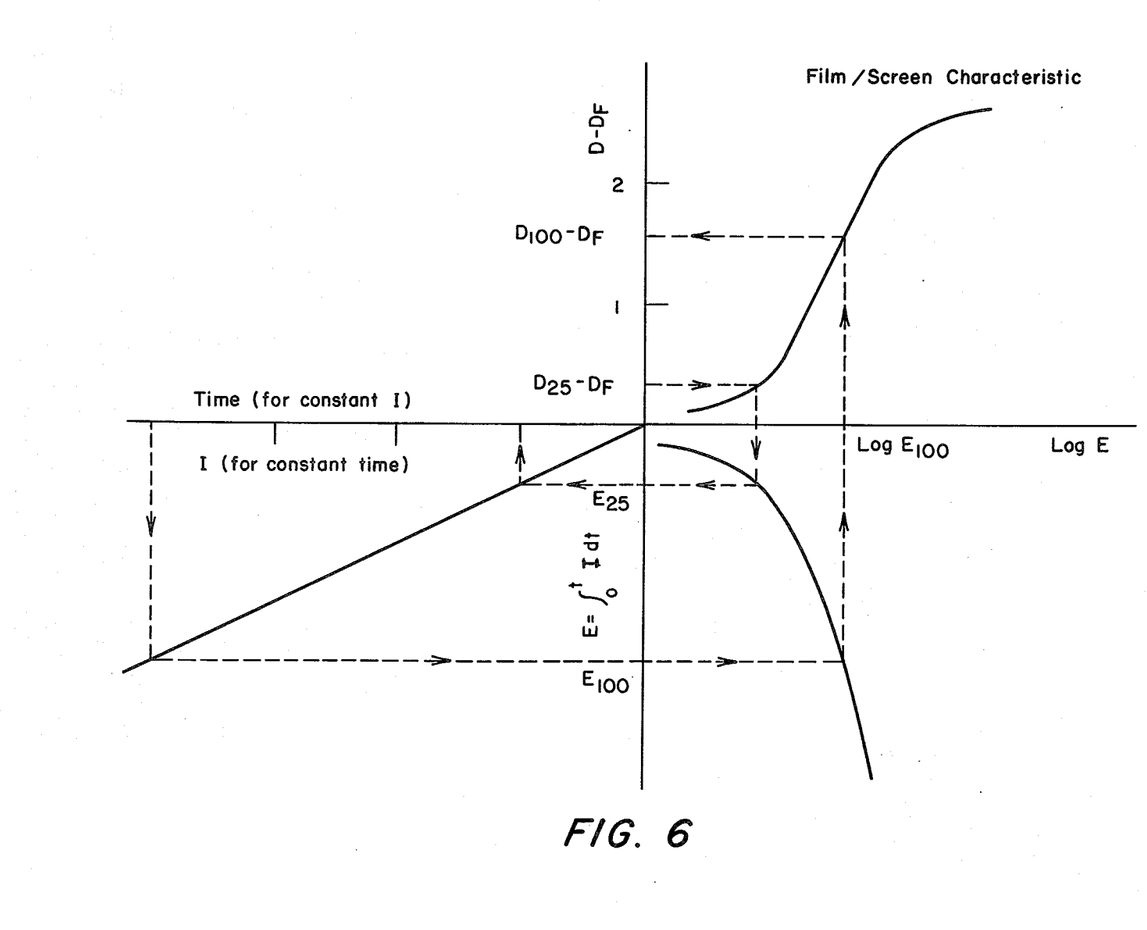
FIG. 6 is a graph of the X-ray film/screen characteristics comparing the density values on a radiograph at 25% radiation exposure compared with 100% radiation exposure.

In a radiograph, it is known that the spatial resolution is about 0.2 mm. between two neighboring pixels, and the gray level at each pixel may be taken at one of 512 possible values. With the present invention, at the lower exposure levels, the gray scale G, as seen in FIG. 6 was calibrated against the optical density scale D by a Kodak Calibrated Neutral Density Attenuator. By identifying the corresponding pixels on four differently exposed radiological images and observing their respective gray values, $G_{100}$, $G_{75}$, $G_{50}$ and $G_{25}$, a gray scale mapping is established. This is done in two corresponding windows of 32×100 pixels, one in each radiological image.

Figure 4:
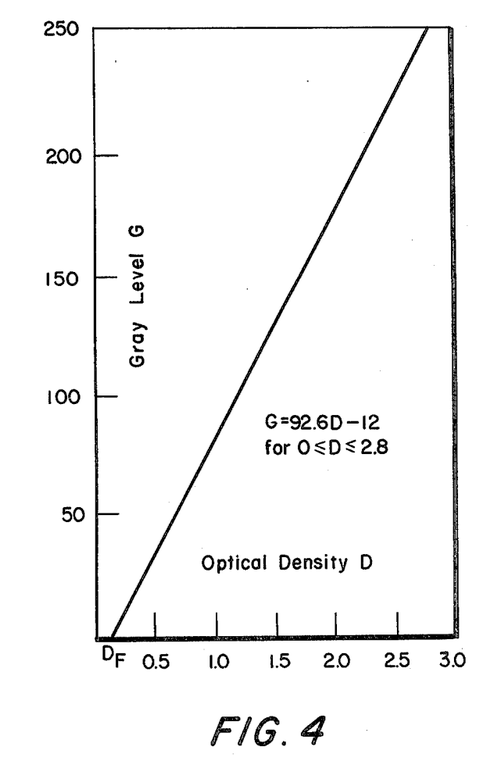
FIG. 4 is a graph plotting pixel gray values against optical density of a radiograph.
Figure 5:
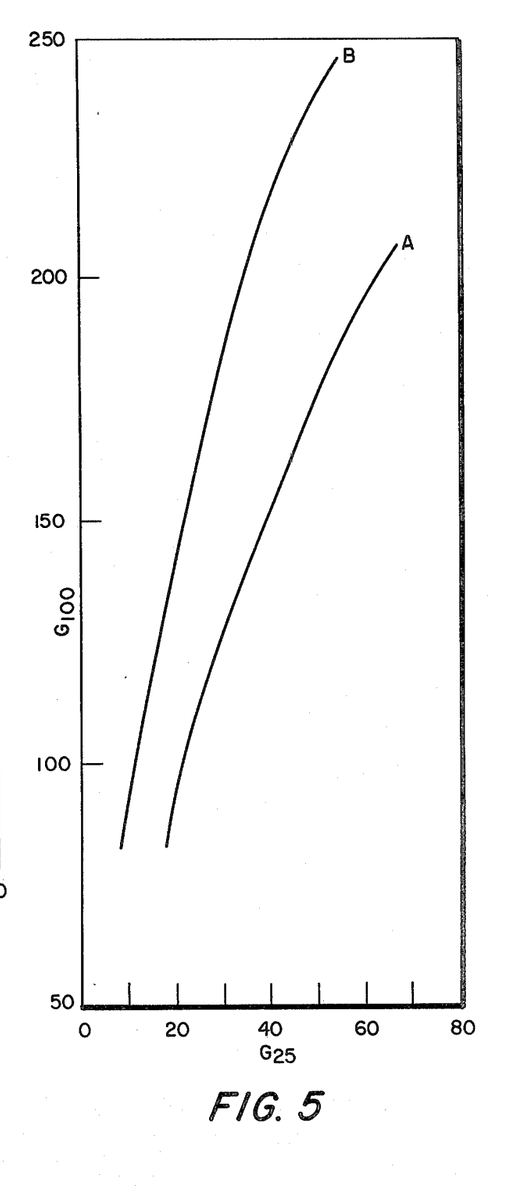
FIG. 5 is a graph comparing the gray value at a pixel in a radiograph at 25% radiation exposure with the gray value of the pixel in a radiograph at 100% radiation exposure.

The grey scale mapping is illustrated in FIG. 5 where $G_{25}$ denotes the gray value at a pixel in the radiograph with 25% exposure, for example, 60 kVp with 15 mas., and $G_{100}$, the gray value at the corresponding pixel in the radiograph with 100% exposure, for example, 60 kVp with 60 mas. Gray values of the radiological images respectively of 25, 50 and 75% radiation intensities are mapped point by point to yield a digitalized image. Therefore, to convert the gray value of each pixel for a radiological image based upon 25, 50 or 75% radiation intensity, the respective gray value is multiplied by a constant factor 4, 2 and 1.33 respectively. FIG. 4 illustrates the mapping of the gray value versus optical density value on a point by point basis.

The operation of the digital imaging processor 30 and computer 32 is accomplished in accordance with the above method to obtain the equivalent of 100% radiation intensity exposure from exposure intensities of a lesser amount, as for example, 50%, 25% or less exposure. For example, a radiograph of a hand obtained at a radiation exposure intensity of 25% or 60 kVp with 15 mas after being digitalized and processed by the digital imaging processor 30 and computer 32 has substantially the same spatial resolution and contrast as that of a radiograph obtained at 100% radiation exposure intensity or at 60 kVp with 60 mas. Thus, the quality of a radiograph obtained at 100% radiation exposure can be obtained by using one fourth of the standard radiation exposure.

The enhancing of minimal exposure radiographs is accomplished in accordance with the following example. Two radiographs of a subject were produced, one at 100% radiation exposure intensity or 60 kVp with 60 mas and another at 25% radiation exposure intensity or 60 kVp with 15 mas of ten steps of one centimeter step, with three tubes containing 15 mg/cc iodine of respectively 5 mm., 3 mm., and 1 mm. diameter. The initial images were digitalized by an Optics International C4100 drum scanner to provide a digitalized radiograph where the spatial resolution was 0.35 mm. between two neighboring pixels and the gray level at each pixel having one of 256 possible values. As seen in FIG. 4, the gray scale G is plotted against optical density scale D by the use of a Kodak Calibrated Neutral Density Attenuator. A gray scale mapping is thus obtained by identifying the corresponding pixel on two differently exposed radiographs and observing their respective gray values $G_{100}$ and $G_{25}$. This was done in two corresponding windows of 32×100 pixels.

As illustrated in FIG. 5, the result is a curve A where $G_{25}$ denotes the gray value at a pixel and the radiograph formed at 25% radiation intensity exposure and $G_{100}$, the gray value at the corresponding pixel in the radiograph formed at 100% radiation intensity exposure. For purposes of illustration, it should be understood that the 100% radiation exposure was taken at 60 kVp with 60 mas and the 25% radiation exposure taken at 60 kVp with 15 mas. The corresponding relationship is plotted to obtain a gray scale mapping from $G_{25}$ to $G_{100}$. Based on this relationship, the gray values of the radiograph with 25% radiation exposure are mapped point by point to yield a digitalized radiograph which is approximately equivalent to a radiograph obtained from 100% radiation exposure. However, it should be pointed out that if the gray value of each pixel of the radiograph formed by 25% intensity exposure is multiplied by a constant factor four, the image obtained is not quite similar to that of a radiograph obtained at 100% radiation intensity exposure. Thus, enhancement of minimal radiographs requires point by point compensation; and this is obtained by the digital imaging processing by the computer 32.

The operation carried out by the computer 32 for the appropriate digital processing of a minimal radiograph to obtain the corresponding qualities of a maximum exposure radiograph is represented graphically as illustrated in FIG. 6. The optical density $D_{25}$ at a pixel on a radiograph is obtained with only 25% exposure intensity. As illustrated on the X-ray film/screen characteristic curve in FIG. 7, the density value and the corresponding exposure value $E_{25}$ appear outside the conventionally used linear region. If $E_{25}$ is multiplied by a factor of four to give $E_{100}$, the optical density value $D_{100}$ corresponding to $E_{100}$ can be obtained from the film/screen characteristic curve. This value is considered as the optical density value which would be obtained should the exposure be increased by a factor of four. Thus in this manner, each point on a radiograph of minimal exposure is individually compensated by the above procedure through the processor 30 and computer 32 of FIG. 1 to read out a digital radiograph containing the image quality comparable to that of the routine standard exposure or exposure taken at 100% of the radiation intensity, i.e. at 60 kVp with 15 mas instead of 60 kVp with 60 mas exposure.

Figure 7:
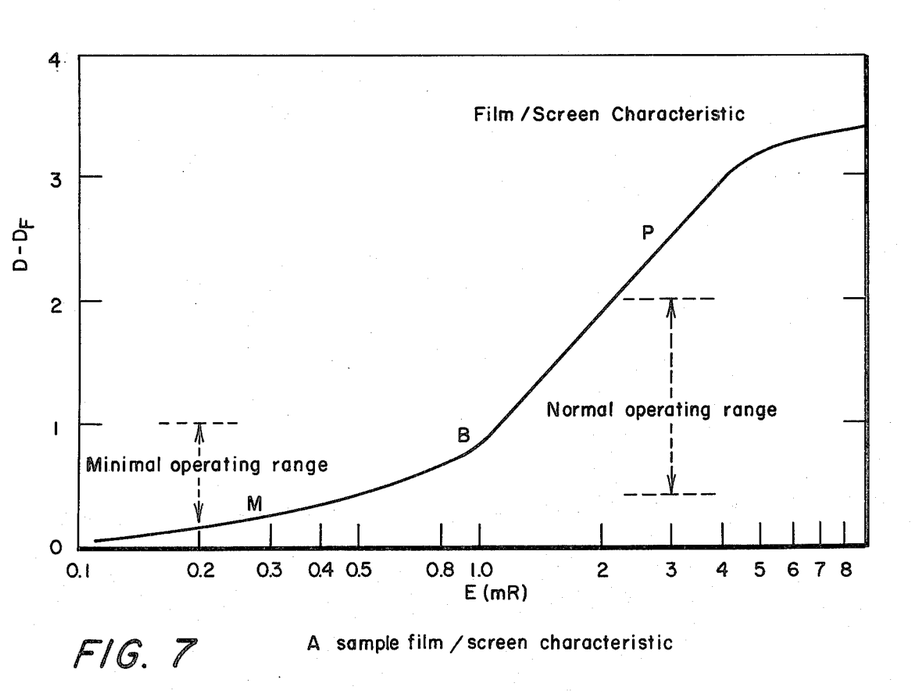
FIG. 7 is a graph of a sample film/screen characteristic comparing the optical density of medical radiographs with the standard exposure.

This procedure is equivalent to applying a nonlinear gain to convert $D_{25}$ to $D_{100}$, point by point, according to the film/screen characteristic for nonlinear gain. This point by point compensation method is applicable strictly to digitalized radiographs. As will be described later in regard to other radiograph systems because image noise may also be amplified, an appropriate filter may be required. Consequently, minimal radiological images with low information density can be processed by various other digital information manipulations such as filtering, masking, compression, suppression, area-based enhancement and the like known in the art.

Figure 8:
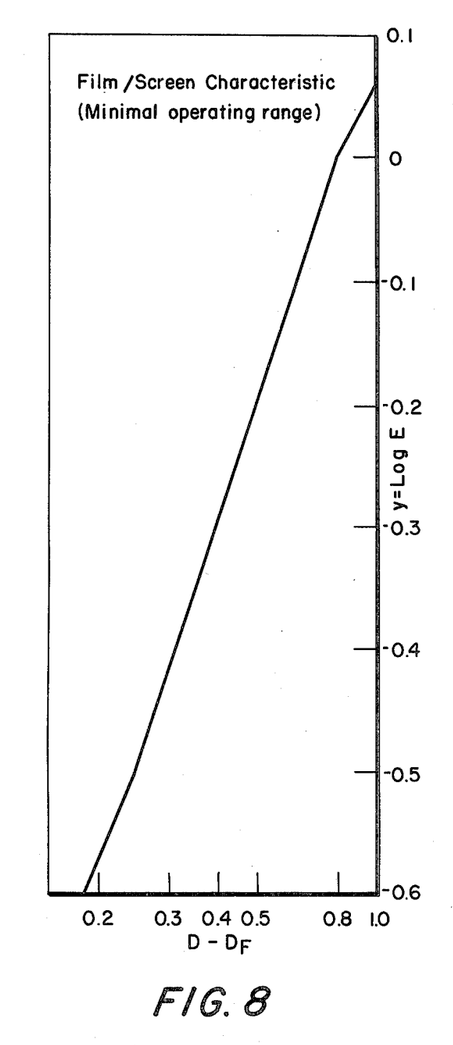
FIG. 8 is a graph of the film/screen characteristic obtained at the 25% radiation exposure.

The optical density of medical radiographs obtained at standard exposure intensities lies approximately in the range between about 0.4 to 2.0. In the case of a nonlinear range MB of a typical film and screen characteristic curve, expressed as $D - D_F$ versus log E, just below the linear range BP as illustrated in FIG. 7 where $D_F$ denotes the log density of the X-ray film and screen. By plotting the values of log E versus the values of $D - D_F$ in the nonlinear range MB which is assumed to be the operating range of the 25% radiation exposure, the relationship illustrated by the curve in FIG. 8 is plotted. In nonlinear range, the film/screen characteristic is expressed as:

$$y = \log E_{25} = f[\log (D_{25} - D_F)].$$

The linear range BP is expressed as:

$$D_{100} - D_F = 3.6 \log E_{100} - 3.6 \log 0.6.$$

For $E_{100} = 4E_{25}$, $$D_{100} - D_F = 3.6 \log E_{25} + 2.966 - 3.6 f[\log (D_{25} - D_F)] + 2.966$$

or $$D_{100} = h(D_{25}).$$

Figure 9:
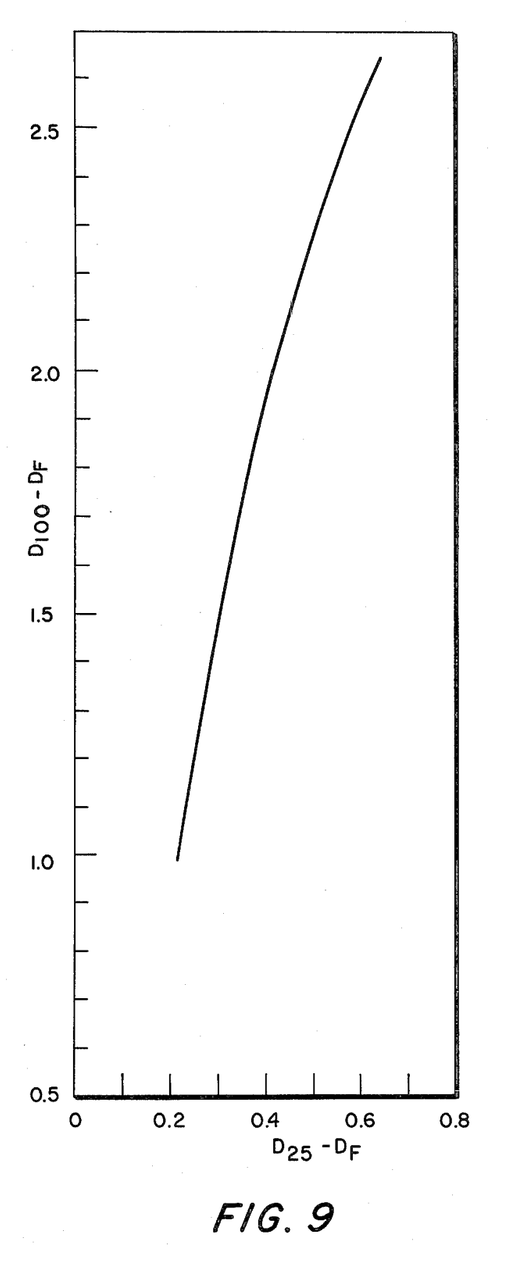
FIG. 9 is a graph illustrating the nonlinar relationship between the gray value at a pixel in a radiograph at 25% radiation exposure with the gray value of each corresponding pixel in a radiograph obtained at a 100% radiation exposure.

The above indicates a nonlinear relationship between $D_{25}$ and $D_{100}$ as plotted by the curve in FIG. 9. According to the gray scale calibrated by the curve in FIG. 4, the corresponding nonlinear relationship between $G_{25}$ and $G_{100}$ is expressed by curve B in FIG. 5. The similar characteristics of curve A and curve B in FIG. 5 support the point by point compensation method which is a nonlinear gain relationship $G_{100} = F(G_{25})$.

Further in accordance with the present invention for the digital compensation of a minimal exposure radiograph for any pixel (i, j) on a radiograph obtained at the minimal exposure, its optical density value $D_m$ (for example, $D_{25}$) is converted to a value $D_s$ (for example, $D_{100}$) in accordance with above described gray scale mapping wherein $D_s = h(D_m)$. When a gray scale is properly calibrated against the optical density scale, a mapping $G_s = F(G_m)$ is established to convert the gray value $G_m$ of the pixel (i, j) on the radiograph with minimal exposure to the new gray value $G_s$ for the pixel (i, j). This compensation is done point by point until all the pixels on the whole radiograph are processed by the computer 32 and processor 30. The processed radiograph thus obtained is substantially equivalent to that obtained using a standard radiation dose.

By the digital processing of a radiograph taken at minimal exposure in accordance with the present invention, the radiation dose per image can be reduced at least by a factor of four or more; since, as demonstrated, an image with an exposure equal to 25% of the routine standard exposure can be used as the minimal-optimal radiograph. This procedure of reducing radiation dose may also be direclty applied to nuclear medicine images where the image obtained at 12.5% exposure may be compensated to give an image equivalent to an image obtained at 100% exposure.

Figure 2:
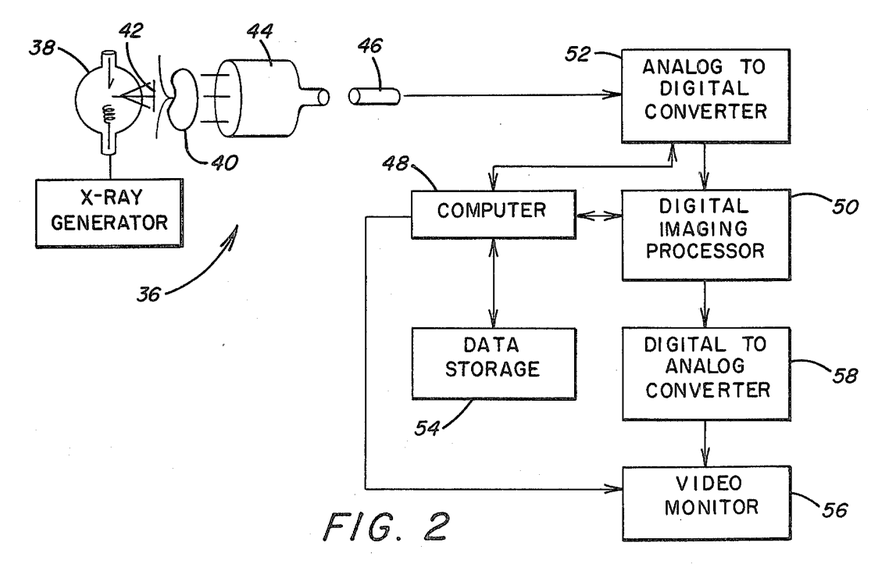
FIG. 2 is a block diagram similar to FIG. 1, illustrating a screen-film radiologic imaging system utilizing computer processing for enhancing an image obtained at 25% exposure to a level of intensity of 100% exposure.

Now referring to FIG. 2, there is illustrated a digital video radiography system generally designated by the numeral 36 operable for use with minimal radiation dosages, i.e. radiation dosages less than 100% of the standard radiation dose and preferably at 25% or less of the standard radiation dose. An X-ray tube 38 of the type described above emits radiation at a minimal exposure intensity, for example, at 60 kVp with 15 mas or 25% of the maximum exposure density, upon a subject 40. The X-rays emitted from the tube 38 pass through a generalized filter 42. The X-rays that pass through the subject 40 are directed into an image intensifier 44. Preferably, the image intensifier 44 is a trimodal type with a high capacity of a large exposure acceptance and resolution. At the output of the image intensifier 44, the X-rays are amplified and converted to an output signal in the form of light.

The light images are then converted by a vidicon camera 46 to electronic signals representing the radiographic image at the 25% dose level. The electronic output from the vidicon camera is in the form of a video signal. The video signal is digitalized by an analog to digital converter or digitalizer 52. The output from the digitalizer 52 is in the form of a digital signal that is processed and stored by a digital imaging processor 50.

In the alternative, the digital signal can be directed from the converter 52 to a computer 48 of the type disclosed and described above. The computer 48 is operable to both feed input to the processor 30 or receive processed data from the processor 30. In both cases where digital imaging data is fed to the computer 48 or to the processor 50 and then to the computer, the data is enhanced in accordance with the above described point by point conversion process to digital data equivalent to data obtained at 100% radiation exposure.

As described above after computer enhancement, the processed images are suitably stored at 54 for later retrieval or directly transmitted from the computer 48 for graphic display on a screen of a video monitor 56. As a further alternative, the processed images are converted from digital data back to analog data by a converter 58. From the converter 58, the analog data is displayed on the screen of the video monitor 56 to provide a pictorial image of the object under examination. As described above for the film/screen system 10, the digital video system 36 is operable to obtain the characteristics of 100% radiation intensity where the radiation does not exceed 25% of the maximum radiation intensity.

It should be understood generally that the present invention is readily adapted to the processing of digitalized information having a low density. The information can be in many forms. The scope of the present information is not limited to the disclosed examples and includes low density imaging information obtained by digital fluoroscopy, digital angiogram, computerized tomograph, nuclear magnetic resonant scanning, and other like techniques.

Figure 3:
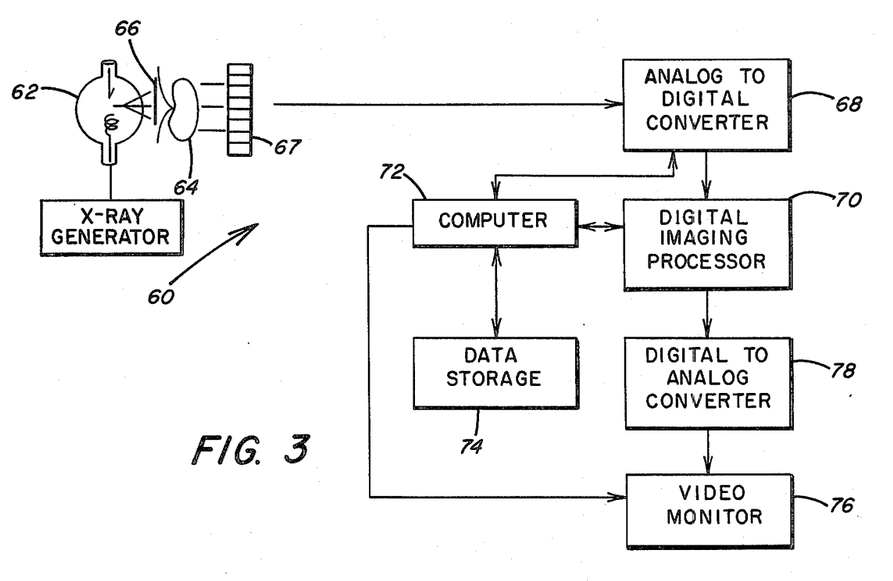
FIG. 3 is a block diagram similar to FIGS. 1 and 2, illustrating the application of computer enhanced digital radiography for a solid state imaging system.

Now referring to FIG. 3, there is illustrated a solid state radiograph system generally designated by the numeral 60 that also includes an X-ray tube 62 operable to generate X-rays at a minimal dosage and preferably at a dosage of 25% of the dosage conventionally emitted by the X-ray tube 62 upon a subject 64. A well known solid state imaging system is the line scan radiographic system as disclosed in U.S. Pat. No. 4,179,100 where the X-rays emitted from the tube 62 pass through a generalized filter 66 and are collimated by a tungsten slit to produce a fan shaped beam which passes through the subject 64 thereby exposing an X-ray intensifier screen 67 to the emitted X-rays at a minimal dose level.

As is well known, the X-ray intensifier screen 67 is used in combination with a series of linear photodiode arrays. Signals are transmitted by the activated diode arrays and are amplified and transmitted as output to an analog to digital converter 68. The converter 68 digitalizes the output from the diode arrays. The digital signal from the converter 68 is directed to a digital imaging processor 70 associated with a computer 72 of the type described above. Once again, the input to the computer 72 from the converter 68 can be suitably stored at 74 or transmitted for readout on a screen in graphic form by a video monitor 76. In addition, the processed images can be converted from digital data back to analog data by a converter 78 for pictorial display of the object on the screen of the video monitor 76. Thus, with the system disclosed in FIG. 3, as well as the systems disclosed and described in FIGS. 1 and 2, the resultant radiograph initially produced at a 25% radiation dose level is enhanced to a 100% radiation dose level to provide the qualities of a standard radiograph produced at the 100% dose level.

According to the provisions of the patent statutes, I have explained the principle, preferred construction and mode of operation of my invention and have illustrated and described what I now consider to represent its best embodiments. However, it should be understood that within the scope of the appended claims, the invention may be practiced otherwise than as specifically illustrated and described.

I claim:

1. Apparatus for radiologic diagnosis of an object by projecting penetrating radiation through the subject comprising,
    a source of radiation for emitting X-rays or Gamma rays at a preselected intensity,
    said radiation source being controlled to emit X-rays or Gamma rays at a preselected magnitude less than 100% of the radiation intensity of said source upon said subject,
    conversion means for converting the radiation emerging from the subject to an output signal corresponding to the intensity of the emerging radiation,
    means for digitalizing said output signal to a digital signal,
    enhancement means for receiving said digital signal and enhancing said digital signal to a corresponding digital signal representing 100% of the radiation intensity by comparing the optical density at a pixel of a radiologic image obtained at a minimal level of radiation intensity less than 100% intensity of the radiation source with the optical density at a pixel of a radiologic image obtained at 100% intensity of the radiation source to obtain a numerical relation between said optical densities,
    means for mapping the optical density values over a preselected area of the radiologic image obtained at the minimal level of radiation intensity,
    means for converting said optical density values at the minimal level of radiation by a preselected factor obtained from said numerical relation to optical density values representative of the 100% level of radiation, and
    image generating means for receiving said enhanced digital signal and producing a radiologic image of the subject.

2. Apparatus for radiologic diagnosis as set forth in claim 1 which includes,
    storage means for receiving said enhanced digital signal from said enhancement means to store said enhanced digital signal for subsequent readout, and
    said storage means being positioned to receive from and transmit to said means for digitalizing said digital signal and to transmit said digital signal to said enhancement means.

3. Apparatus for radiologic diagnosis as set forth in claim 1 which includes,
    second conversion means for converting said enhanced digital signal to an analog signal, and
    said image generating means being operable to produce a pictorial image of the subject from said analog signal.

4. Apparatus for radiologic diagnosis as set forth in claim 1 in which,
    said means for digitalizing includes an analog to digital converter operable to convert an input signal representing the radiation emerging from the subject at said preselected magnitude less than 100% of the radiation intensity of said source to a corresponding digital signal.

5. Apparatus for radiologic diagnosis as set forth in claim 1 in which,
    said image generating means includes a video display monitor operable to receive said enhanced digital signal and display graphically a radiologic image of the subject whereby said graphic radiologic image has the spatial resolution and contrast of a graphic radiologic image obtained at 100% of the radiation intensity of said source.

6. Apparatus for radiologic diagnosis as set forth in claim 5 which includes,
    a digital to analog converter for converting said enhanced digital signal to an analog signal, and
    said video display monitor being operable to generate from said analog signal a pictorial image of the subject whereby said pictorial image has the spatial resolution and contrast of a pictorial image obtained at 100% of the radiation intensity of the source.

7. A method for generating a radiologic image of a subject exposed to penetrating radiation comprising the steps of,
    emitting a beam of radiation from a source at a preselected magnitude less than 100% of the radiation intensity of the source,
    projecting the beam of radiation at reduced intensity through the subject,
    converting the radiation emerging from the subject to an output signal corresponding to the intensity of the emerging radiation,
    digitalizing the output signal to a digital signal,
    enhancing the digital signal to a corresponding digital signal representing 100% of the radiation intensity of the source by comparing the optical density at a pixel of a radiologic image obtained at a minimal level of radiation intensity less than 100% intensity of the radiation source with the optical density at a pixel of a radiologic image obtained at 100% intensity of the radiation source to obtain a numerical relation between said optical densities,
    mapping the optical density values over a preselected area of the radiologic image obtained at the minimal level of radiation intensity, converting said optical density values at the minimal level of radiation by a preselected factor obtained from said numerical relation to optical density values representative of the 100% level of radiation, and processing the enhanced digital signal to produce a radiologic image of the subject.

8. A method for generating a radiologic image of a subject as set forth in claim 7 which includes, generating a 100% information density radiologic image from said enhanced digital signal obtained from a radiologic image having an information density less than 100%.

* * * * *